United States Patent Office 3,490,880
Patented Jan. 20, 1970

3,490,880
PROCESS FOR THE PRODUCTION OF PURIFIED ALKALINE EARTH BRINES
Robert K. Charlesworth, Walnut Creek, Calif., assignor to The Dow Chemical Company, Midland, Mich., a corporation of Delaware
No Drawing. Filed Nov. 3, 1965, Ser. No. 506,256
Int. Cl. C01f 5/26, 11/32; B01j 9/04
U.S. Cl. 23—312
14 Claims

ABSTRACT OF THE DISCLOSURE

This invention relates to a method for purifying magnesium chloride and calcium chloride brines containing NaCl and/or KCl impurities by contacting such brine with a water-insoluble monohydric or dihydric alcohol containing 4 to 20 carbon atoms, separating the organic and aqueous phases and stripping the organic phase with water to recover the purified brine.

This invention relates to a process for the production of purified alkaline earth brines and is particularly related to a solvent extraction process for the separation of alkali metal salts from magnesium and calcium halides in brines.

It is an object of this invention to provide a process whereby the alkaline earth components in brines rich in such components may be purified by separation from alkali metal salt impurities usually present in such brines. A further object of this invention is to provide a continuous solvent extraction process whereby a purified magnesium chloride or calcium chloride brine may be produced from brines also containing sodium, potassium and in some instances, sulfate ions. These and other objects and advantages of the present process will become evident from reading the following detailed specification.

It has now been discovered that purified alkaline earth brines may be produced from impure alkaline earth brines containing alkali metal salt impurities by selectively extracting the alkaline earth metal values from said brine into a substantially water-immiscible monohydric or dihydric alcohol extractant, separating the alkaline earth-containing organic extractant phase from the aqueous phase and stripping the alkaline earth compounds from the extractant with water to produce a purified brine. Surprisingly, the selectively of water-immiscible extractants has been found related to the concentration of alkaline earth metal salts in the brine. In order to exhibit a substantial differential solvation between the alkaline earth metal salts such as $MgCl_2$ and $CaCl_2$ and alkali metal salts such as NaCl and KCl, it is necessary for the brine to contain at least 20% by weight of alkaline earth metal salts. This process is particularly effective on $MgCl_2$ and $CaCl_2$ brines containing from 20 to 45 weight percent of $MgCl_2$, $CaCl_2$ or mixtures thereof.

The substantially water-immiscible monohydric or dihydric alcohol extractants which are useful in the process of this invention are liquids which contain from 4 to 20 carbon atoms, preferably from 4 to 9 carbon atoms, and include for example, n-butyl alcohol, isobutyl alcohol, amyl alcohol, n-hexyl alcohol, n-heptyl alcohol, 2,6-dimethyl-4-heptanol, 2-ethyl hexanediol 1-3, benzyl alcohol, α-methylbenzyl alcohol, 1,8-octanediol, 4,5-octanediol, 1,18-octadecanediol, 2,3-dimethyl-2,3-butanediol, 2,3-diphenyl-2,3-butanediol, 3,4-diethyl-3,4-hexanediol, 1,10-decanediol, 3-methyl-2,4-heptanediol, 1,9-nonanediol, 2,3,4-trimethyl-1,3-pentanediol and the like. Such extractants may be used alone, or in combination with one another, or in combination with any liquid diluent which is chemically inert to the extraction system and which will form a single phase with the organic extractant. In the case of alcohols which are solids at extraction temperature, it is, of course, necessary to employ a liquid diluent or solvent for such alcohol.

The method of this invention may be applied in treating any aqueous brine rich in water-soluble alkaline earth chlorides and bromides which contain alkali metal salt impurities. Such brines include the natural brines, such as Monroe brine, sea water bitterns, oil well brines, brines derived from the Great Salt Lake, from dry lake bed leaches and the like when concentrated, e.g. by evaporation of water, to a concentration of at least 20 weight percent of alkaline earth metal salts, thereby rendering them suitable for treatment by the present process. This process has particular utility in the purification of magnesium chloride brines containing greater than 20 percent by weight $MgCl_2$ where such $MgCl_2$ is to be ultimately used as feed to electrolytic cells for the production of the metallic magnesium. If such brines contain significant amounts of $CaCl_2$, they are usually treated with a soluble sulfate to remove the calcium as an insoluble precipitate prior to the extraction step.

An alcohol extractant of the class above-defined is contacted with the alkaline earth brine in any suitable manner to provide intimate contact between the brine and the extractant, e.g. by countercurrent flow, stirring, shaking, and the like. Such contact may be done batchwise but the process is particularly suitable for use in continuous flow multiple stage countercurrent extraction. Contact times greater than 1 minute per stage are generally required for adequate extraction with from 2 to 6 minutes per stage being preferred. It is understood, of course, that adequate agitation and mixing between the brine and the extractant is necessary to achieve efficient extraction and that the contact time required will be dependent, at least in part, on the adequacy of such mixing. Longer contact time will be required per stage when good mixing is not achieved and shorter contact times may be used when good mixing is employed.

In the extraction step, a volume ratio of organic phase to aqueous phase of 2:1 to 10:1 is usually employed with ratios of 4:1 to 6:1 being preferred. At the lower ratios, more extraction stages are necessary in order to maintain a high recovery of magnesium or calcium.

The temperature of the liquids during the extraction step is not critical, and may range from near the freezing point of water to near the boiling point of water but temperatures within a range of from about 15° C. to 70° C. are usually employed at atmospheric pressure, and temperatures of from 25° C. to 60° C. are preferred. To determine the optimum temperature for any given extraction herein several factors are considered. The use of higher temperatures, within the range just mentioned, reduces the capacity of the organic phase for $MgCl_2$ and therefore decreases the quantity of $MgCl_2$ removed from the brine per pass of a given quantity of the organic extractant. Likewise, at a given agitator speed and residence time an increase in temperature lowers stage efficiency but at the same time causes an increase in the rate of phase separation. The balance between these factors is varied depending upon the results required.

After intimate contact between the monohydric or dihydric alcohol extractant and the brine for effecting the extraction, the organic and aqueous phases are allowed to settle into layers. The phases are easily separated by drawing off one or both such layers. A significant portion of the alkaline earth values originally present in the brine are solvated by the organic phase and removed from the aqueous phase. Alkali salts, such as sodium and potassium chlorides, are substantially unaffected by the extraction and remain in the aqueous phase.

The organic phase, after extraction of the brine, is a solution of alkaline earth values such as $MgCl_2$ and $CaCl_2$ together with only relatively minor amounts of alkali salts such as NaCl and KCl. Additional purification may be achieved at this point by scrubbing the organic phase with small amounts of water. In general one volume of water used to scrub from 20 to 70 volumes of alkaline earth rich organic extractant will remove substantially all the remaining alkali metal salt impurities while removing only 10 to 40 percent by weight of the alkaline earth values. The aqueous effluent of this scrubbing step may be recycled to the extraction step for additional recovery of the alkaline earth values if desired.

To recover the alkaline earth values from the organic phase, such phase is stripped with one volume of water for each 6 to 15 volumes of an organic extractant. These ratios are not critical, however, and will vary somewhat depending on the desired concentration of the $MgCl_2$ brine product desired. The aqueous phase then contains a highly purified alkaline earth brine and the organic phase is suitable for recycle to the extraction step.

Some organic extractant is entrained in the aqueous phase during the stripping steps. If it is economically desirable to do so, the organic extractant may be recovered from such aqueous phase by flashing under vacuum, distillation, and the like.

The following examples are provided as a more detailed description of the various embodiments of the invention, but are not to be construed as limiting the scope thereof.

EXAMPLE 1

In order to demonstrate the selectivity of a variety of water-immiscible alcohols for an alkaline earth metal chloride as opposed to an alkali metal chloride, a number of experiments were conducted wherein 25 milliliter samples of a $MgCl_2$ solution or a NaCl solution were admixed with 25 milliliters of an alcohol, as indicated in the following table and the mixture was agitated for a period of 3 minutes at a temperature of 25° C. After agitation of the mixture, the phases were separated and analyzed for $MgCl_2$ or NaCl content. The results were as follows:

| Monohydric alcohol extractant | From $MgCl_2$ Soln., Conc. of $MgCl_2$ weight percent | | From NaCl Soln., Conc. of NaCl weight percent | |
|---|---|---|---|---|
| | Organic | Aqueous | Organic | Aqueous |
| n-Butyl alcohol | 7.96 | 30.22 | 0.181 | 25.78 |
| Isobutyl alcohol | 3.84 | 30.93 | 0.085 | 25.96 |
| n-Amyl alcohol | 4.75 | 30.64 | 0.069 | 26.01 |
| n-Hexyl alcohol | 1.89 | 31.31 | 0.022 | 26.01 |
| n-Heptyl alcohol | 1.98 | 30.94 | 0.036 | 26.63 |
| n-Octyl alcohol | 2.57 | 31.04 | 0.025 | 26.02 |
| Benzyl alcohol | 1.75 | 31.20 | 0.069 | 25.96 |

EXAMPLE 2

Thirty-five (35) milliliters of a solution composed of 50% by volume of 2-ethylhexanediol-1,3 in m-xylene was contacted by shaking with 35 ml. of a 4 molar $MgCl_2$ solution in a separatory funnel. The organic phase was analyzed and was found to be 0.253 molar in $MgCl_2$. Similar experimentation with a sodium chloride brine shows 2-ethylhexanediol-1,3 to extract little or no NaCl.

EXAMPLE 3

Into a series of three laboratory scale mixer-settlers was fed a magnesium chloride brine having the following composition in weight percent:

Magnesium chloride _____ 36.2
NaCl _____ 0.295
$CaCl_2$ _____ 0.213
KCl _____ 0.0286

In each mixer-settler the agitator speed was 300 r.p.m. The magnesium chloride brine was continuously metered into this system at a rate of 7.5 milliliters per minute and n-butanol organic extractant was continuously fed counter-currently at a flow rate of 30 milliliters per minute. In each mixer-settler stage, the contact time between the organic and aqueous phases was 4 minutes and the operation was continued for 5.5 hours, from the third mixer-settler. The aqueous layer was discarded, and the organic layer was scrubbed with 0.8 ml./min. of water in 2 countercurrent stages to effect a practically complete removal of the impurities. After separation of the phases resulting from the water scrubbing step, the organic phase was stripped with 3.9 ml./min. of water, the stripped organic extractant was returned to the extraction section, and the magnesium chloride brine from the stripping section was found to contain 19.8 weight percent $MgCl_2$, 57 p.p.m. Na and 170 p.p.m. Ca.

I claim:
1. A process for the purification of impure magnesium chloride or calcium chloride brines containing sodium chloride, potassium chloride or mixtures thereof as impurities which comprises intimately contacting said impure brine with a water-immiscible monohydric or dihydric alcohol extractant containing from 4 to 20 carbon atoms in the alcohol molecule to form a liquid organic phase containing extracted magnesium chloride or calcium chloride and a liquid aqueous phase containing said impurities, separating the organic and aqueous liquid phases, and stripping the organic phase with water to form a purified magnesium chloride or calcium chloride brine.

2. A process for the purification of impure magnesium chloride or calcium chloride brines containing sodium chloride, potassium chloride or mixtures thereof as impurities which comprises intimately contacting an impure brine containing at least 20% by weight of at least one of magnesium chloride and calcium chloride with a water-immiscible monohydric or dihydric alcohol extractant containing from 4 to 20 carbon atoms in the alcohol molecule to form a liquid organic phase containing extracted magnesium chloride or calcium chloride and a liquid aqueous phase containing said impurities, separating the organic and aqueous liquid phases, and stripping the organic phase with water to form a purified magnesium chloride or calcium chloride brine.

3. The process of claim 2 wherein the alcohol extractant is n-butanol.

4. The process of claim 2 wherein the alcohol extractant is isobutyl alcohol.

5. The process of claim 2 wherein the alcohol extractant is n-amyl alcohol.

6. The process of claim 2 wherein the alcohol extractant is n-octanol.

7. The process of claim 2 wherein the alcohol extractant is 2-ethylhexanediol.

8. A process for the purification of impure magnesium chloride and calcium chloride brines containing sodium chloride, potassium chloride or mixtures thereof as impurities which comprises intimately contacting an impure brine containing from 20 to 45 percent by weight of at least one of magnesium chloride and calcium chloride at a temperature of from 15° C. to 70° C. with a water-immiscible monohydric or dihydric alcohol extractant containing from 4 to 20 carbon atoms in the alcohol molecule to form a liquid organic phase containing extracted magnesium chloride or calcium chloride and a liquid aqueous phase containing said impurities, separating the organic and aqueous liquid phases and stripping the organic phase with water to form a purified magnesium chloride or calcium chloride brine.

9. The process of claim 8 wherein the alcohol extractant is n-butanol.

10. The process of claim 8 wherein the alcohol extractant is isobutyl alcohol.

11. The process of claim 8 wherein the alcohol extractant is n-amyl alcohol.

12. The process of claim 8 wherein the alcohol extractant is n-octyl alcohol.

13. The process of claim 8 wherein the alcohol extractant is 2-ethylhexanediol.

14. A process for the preparation of a purified magnesium chloride brine from an impure magnesium chloride brine containing sodium chloride or potassium chloride impurities which comprises intimately contacting each volume of an impure magnesium chloride brine containing 20 to 45% by weight of $MgCl_2$ at a temperature of from 25 to 60° C. with from 4 to 6 volumes of n-butanol to form a liquid organic phase containing extracted magnesium chloride and a liquid aqueous phase containing said impurities, separating the organic and aqueous liquid phases and stripping organic phase with water to form a purified magnesium chloride brine.

References Cited

UNITED STATES PATENTS

| | | | |
|---|---|---|---|
| 2,381,994 | 8/1945 | Belchetz | 23—312 X |
| 2,967,825 | 1/1961 | Baniel | 23—312 X |
| 3,329,479 | 7/1967 | Hustinx | 23—90 |
| 3,341,282 | 9/1967 | Kimberlin | 23—91 |
| 3,352,634 | 11/1967 | Buchmann | 23—91 |

FOREIGN PATENTS 260,141  5/1913  Germany.

WILBUR L. BASCOMB, Jr., Primary Examiner

S. J. EMERY, Assistant Examiner

U.S. Cl. X.R.

23—89, 90, 91, 300, 302